United States Patent [19]
Gates

[11] 3,913,663
[45] Oct. 21, 1975

[54] ENERGY CONSERVATION CHAMBER

[76] Inventor: Jack R. Gates, 2527 W. Water, Springfield, Mo. 65802

[22] Filed: May 3, 1974

[21] Appl. No.: 466,858

[52] U.S. Cl. .................................. 165/102; 165/154
[51] Int. Cl.² .......................................... F28F 9/22
[58] Field of Search ..... 122/DIG. 1, DIG. 2, DIG. 3; 126/102–106; 165/102, 103, 154, 121–125

[56] References Cited
UNITED STATES PATENTS

| | | | |
|---|---|---|---|
| 1,972,549 | 9/1934 | Cameron | 165/122 X |
| 2,276,400 | 3/1942 | Hubbard | 165/122 |
| 2,793,638 | 5/1957 | Walter | 126/102 X |
| 3,195,623 | 7/1965 | Chapin | 126/102 X |

Primary Examiner—Charles J. Myhre
Assistant Examiner—Theophil W. Streule, Jr.
Attorney, Agent, or Firm—Clarence A. O'Brien; Harvey B. Jacobson

[57] ABSTRACT

Discharging heated gas from a combustion fuel heating apparatus is directed along a circuitous path through spaced inner and outer chambers prior to discharge. Incoming air is directed through an intermediate chamber between the inner and outer flue chamber paths for a heat transfer thereto and a preheating of the incoming air.

7 Claims, 10 Drawing Figures

U.S. Patent Oct. 21, 1975 Sheet 1 of 3 3,913,663
Fig. 1
Fig. 2
Fig. 3
Fig. 4
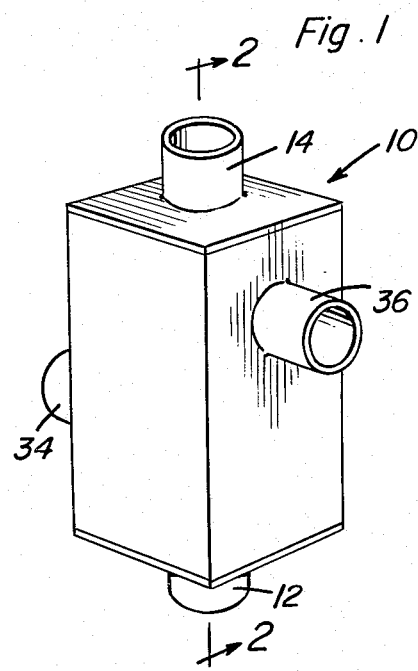
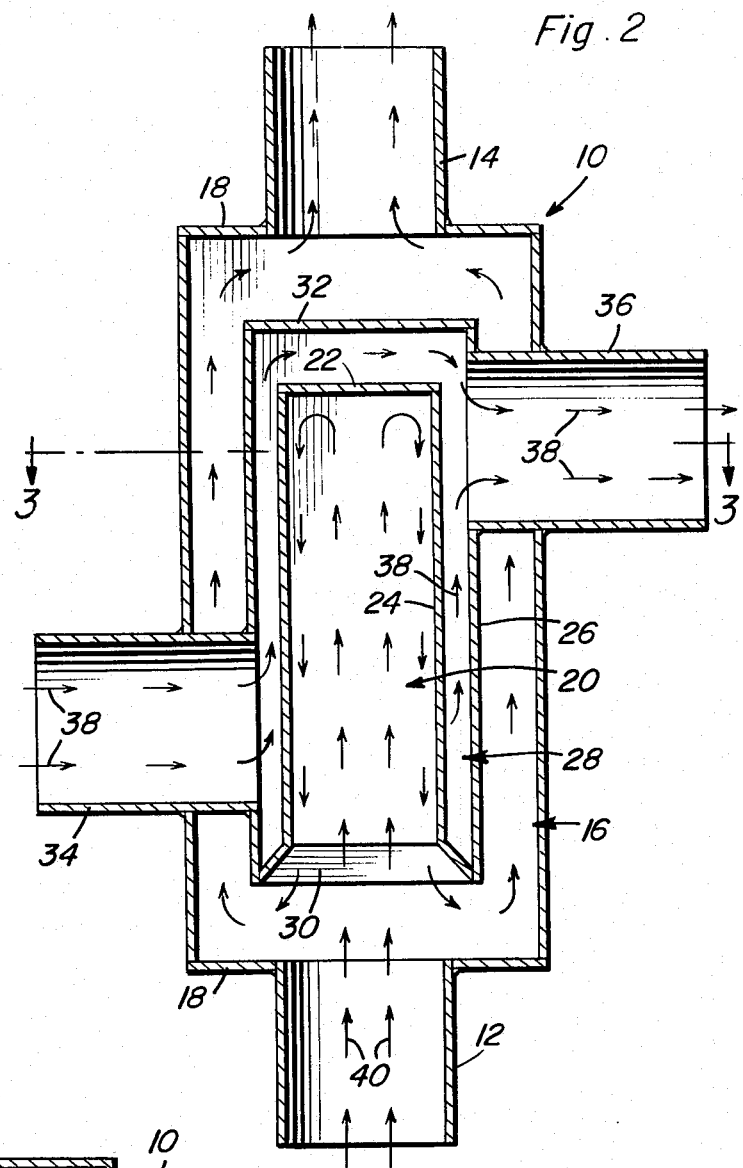
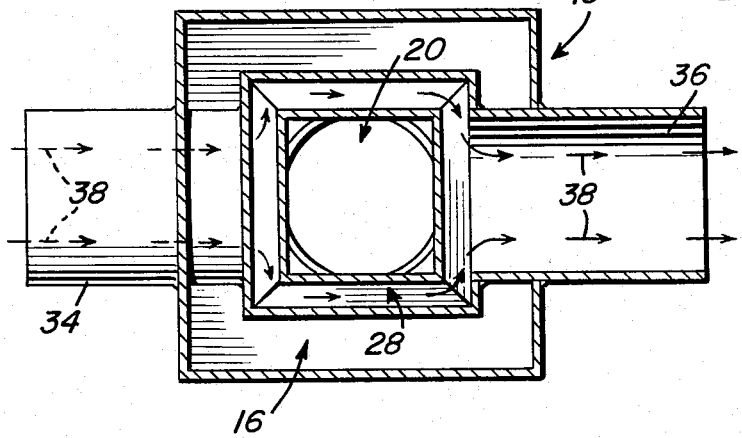
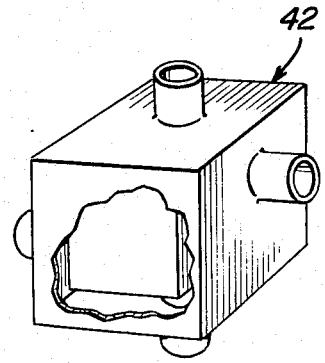

ENERGY CONSERVATION CHAMBER

The invention herein generally relates to an energy conservation system, and is more particularly concerned with means for utilizing the heat in waste or flue gases of a combustion fuel heating system for a preheating of incoming air.

Among the objects of the invention are the provision of a system which, through a preheating of the incoming air, results in a substantial increase in the efficiency of the system, including the production of a greater heating output in conjunction with a decrease in fuel consumption.

In conjunction with the above objects, it is also considered pertinent that the efficiency increasing apparatus of the invention requires no movable parts which could cause operational difficulties. On the contrary, the apparatus is adapted for incorporation into substantially any conventional combustion fuel heating apparatus, for example a home heating furnace, with the flows therethrough being induced either by the natural movement of the gas and air during the respective heating and cooling thereof or by the normally supplied blower means associated with the furnace or the like.

Basically, the apparatus of the invention includes inlet and outlet flue ducts engaged with the opposite ends of an enlarged outer chamber, an inner chamber in inwardly spaced relation within the outer chamber and an intermediate chamber surrounding the inner chamber. The inner chamber has an open end axially aligned with the inlet flue duct and a closed second end whereby flue gas flowing into the inner chamber will, upon a slight cooling thereof, flow in a reverse direction out of the inner chamber for movement through the outer chamber to the flue outlet. The flow of flue gases thus passes along both the inner and outer walls of the intermediate chamber. The intermediate chamber is in turn completely sealed from the inner and outer chambers and communicated solely with the oppositely directed inlet and outlet gas or air flow ducts for a continuous movement of the incoming air through the intermediate chamber in heat exchanging relationship with the flue gases.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a perspective view of the apparatus of the present invention;

FIG. 2 is an enlarged vertical cross-sectional view taken substantially on a plane passing along line 2—2 in FIG. 1;

FIG. 3 is a cross-sectional view taken substantially on a plane passing along line 3—3 in FIG. 2;

FIG. 4 illustrates, in perspective with a portion broken away for purposes of illustration, a variation of the apparatus;

Figure 5:
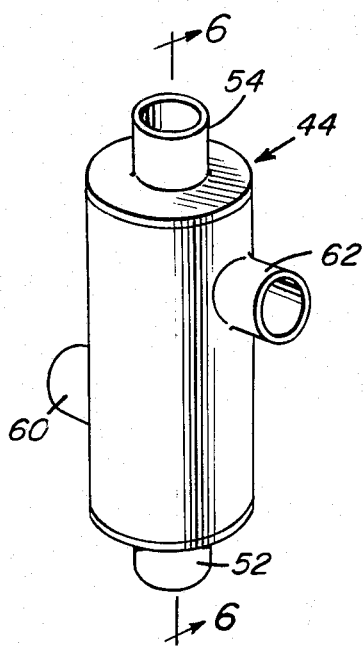
FIG. 5 is a perspective view of a further variation of the apparatus wherein the chambers or compartments are of generally cylindrical configuration.

Referring now more specifically to the drawings, and with particular reference to FIGS. 1, 2 and 3, reference numeral 10 is used to generally designate the apparatus comprising the present invention. This apparatus 10 is intended to receive the waste or flue gas of a combustion fuel heating system, for example a home heating furnace, and provide for a preheating of incoming air.

Accordingly, inlet and outlet flue ducts, respectively designated by reference numerals 12 and 14, are communicated with the opposite ends of a vertically elongated enlarged rectangular outer chamber 16. These ducts 12 and 14 are sealed to the opposed end walls 18 of chamber 16 centrally thereof.

An elongated rectangular double-walled inner chamber 20 is located centrally within the outer chamber 16. This inner chamber 20 includes a first open end axially aligned with the inlet flue duct 12 in inwardly spaced relation thereto within the outer chamber 16. The second end of the inner chamber 20 is closed by an end wall 22 peripherally sealed to the inner wall 24 of the inner chamber 20.

The second wall 26, forming the double-walled inner chamber 20 is outwardly spaced from the inner wall 24 so as to define a third or intermediate chamber 28. This intermediate chamber 28 is sealed peripherally about the open end of the inner chamber 20 by a flaring annular wall 30 for enhancing the air flow as shall be explained subsequently. The second end of the intermediate chamber 28 is closed by a plate-like end wall 32 outwardly spaced from the end wall 22 of the inner chamber 20.

The intermediate chamber 28 is specifically provided for the accommodation of incoming air or gases which are to be heated by the discharging flue gases. As such, an inlet air flow duct 34 is communicated with the lower portion of the intermediate chamber 28 to one side thereof and a similar outlet air flow duct 36 is communicated with the intermediate chamber 28 to generally the opposite side thereof at the upper portion of the chamber. Both of these ducts 34 and 36 pass through the outer wall of the outer chamber 16 and are of course sealed thereto peripherally thereabout in an airtight manner.

Noting the flow path arrows in FIGS. 2 and 3, the incoming air, designated by arrows 38, is fed into the intermediate chamber 28 through the inlet duct 34 for movement completely thereabout and vertically therethrough in contact with both the inner and outer walls 24 and 26 of the intermediate chamber 28 and hence the inner chamber 20 and outer chamber 16. After movement of the air 38 through the intermediate chamber 28, the air discharges through the outlet duct 36. At the same time, the flue gas flow, designated by arrows 40, moves inwardly through the inlet flue duct 12, across the intervening lower portion of the outer chamber 16, and into the inner chamber 20. The hot gas 40 moves upward centrally within the inner chamber 20, cooling slightly as it moves inward and reversing direction at the inner end wall 22 of the chamber 20 for movement downward along the chamber wall 24. During this movement through the inner chamber 20, it will be appreciated that the heat of the flue gas 40 is being transferred, through the chamber wall 24, to the air flow 38 for a warming thereof. As the flue gas returns to the open lower end of the inner chamber 20, the gas is outwardly directed, through the flared mouth-forming lower wall 30 of the intermediate chamber 28, so as to flow outwardly and upwardly through the outer chamber 16. This outward and upward flow is encouraged by the relatively cooler air thereabove and continues through the outlet or discharge flue duct 14. It will also be appreciated that as the warm flue gases travel upward through the outer chamber 16, heat transferring contact is made with the outer wall 26 of the intermediate chamber 28, thus further heating the air flowing therethrough. Basically, the flue gas, a heated product of combustion, follows a tortuous path heating both the inner and outer walls of an intermediate chamber through which incoming air passes. In this manner, a maximum heat exchange situation is provided.

FIG. 4 is of interest in illustrating the apparatus, herein designated by reference numeral 42, constructed utilizing cube-shaped chambers rather than the elongated rectangular configuration of FIGS 1-3. In all other aspects, operation of the apparatus 42 is the same as that described supra.

Figure 6:
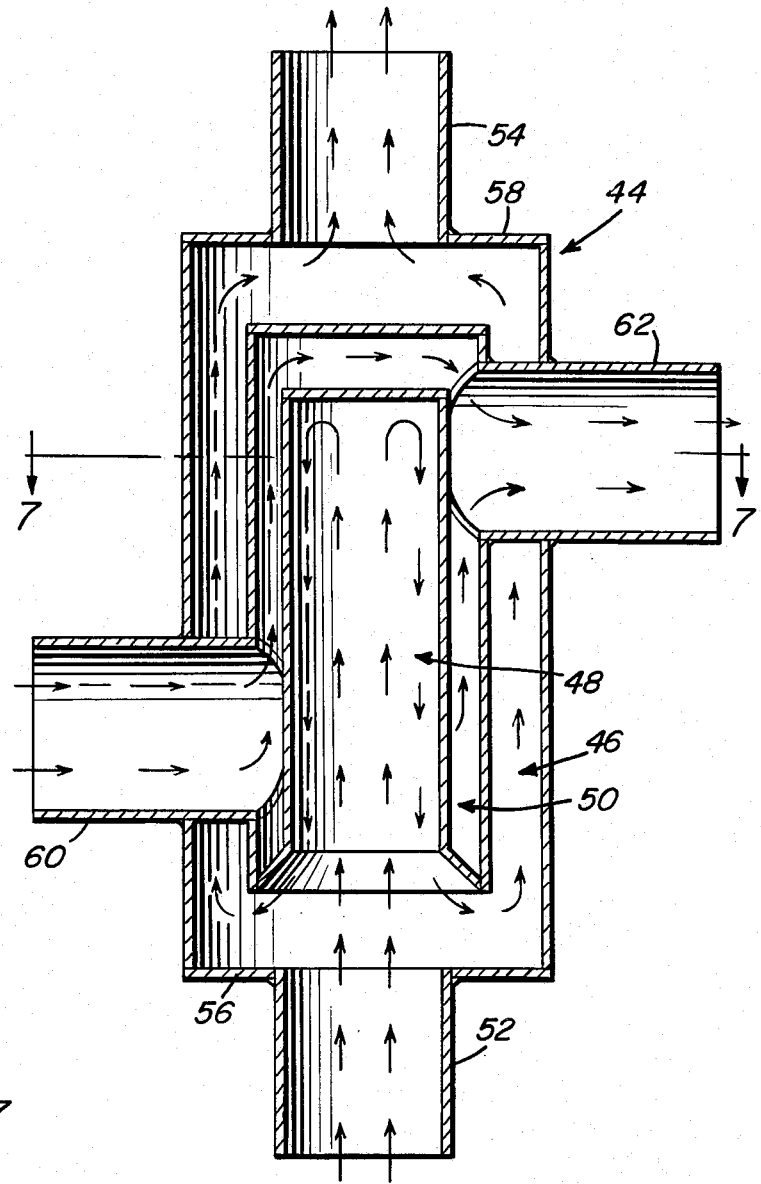
FIG. 6 is an enlarged cross-sectional view taken substantially on a plane passing along line 6—6 in FIG. 5.
Figure 7:
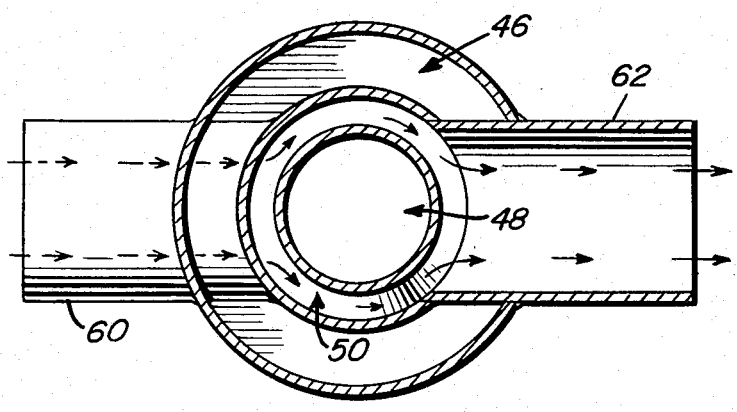
FIG. 7 is a cross-sectional view taken substantially on a plane passing along line 7—7 in FIG. 6.

FIGS. 5, 6 and 7 illustrate a further variation wherein the apparatus, herein designated by reference numeral 44, utilizes cylindrical outer, inner and intermediate chambers, respectively designated by reference numerals 46, 48 and 50. As with apparatus 10, the flue inlet and outlet ducts 52 and 54 are communicated with the opposite ends of the large outer chamber 46 through the opposed circular end walls 56 and 58 thereof. The air flow ducts 60 and 62 are respectively communicated with the cylindrical intermediate chamber 50 at lower and upper portions thereof respectively, these ducts 60 and 62 being sealed in an airtight manner to the outer cylindrical wall of the outer chamber 46 as they pass therethrough. The heat exchanging flow of gases and air, designated by the flow arrows in FIGS. 6 and 7, is the same as that described in detail in conjunction with the form of FIGS. 1, 2 and 3.

Figure 8:
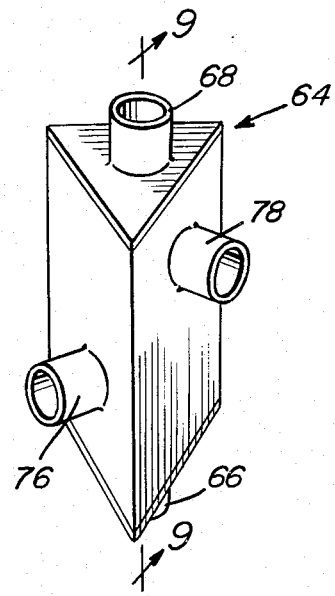
FIG. 8 is a perspective view of a further variation of the apparatus wherein the chambers are of a triangular or triangular prism configuration.
Figure 9:
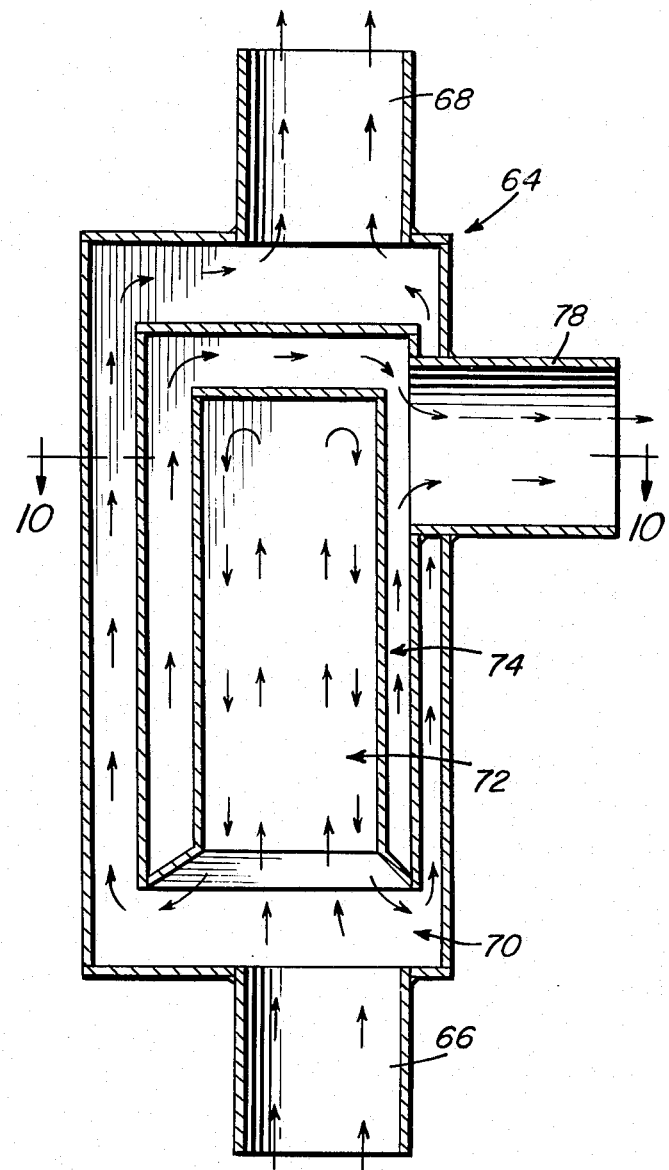
FIG. 9 is an enlarged cross-sectional view taken substantially on a plane passing along line 9—9 in FIG. 8.
Figure 10:
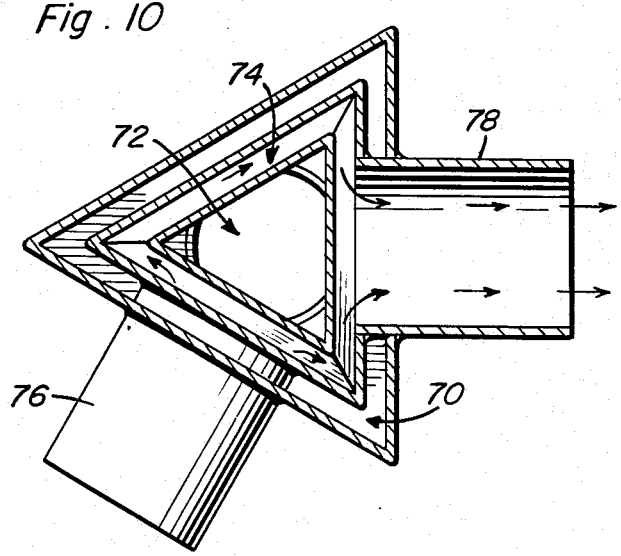
FIG. 10 is a cross-sectional view taken substantially on a plane passing along line 10—10 in FIG. 9.

FIGS. 8, 9 and 10 illustrate another variation wherein the apparatus, designated by reference numeral 64, has each of the chambers therein formed of a basic triangular or prismatic triangular configuration. As with the previously described embodiments, flue inlet and outlet ducts 66 and 68 communicate with the opposite ends of an enlarged outer chamber 70. A centrally located inner chamber 72, which receives and redirects the incoming flue gas, is surrounded by an intermediate chamber 74 through which the air travels. The air itself enters through an intake duct 76 and discharges through an outlet duct 78. The heat exchanging flow of gases is the same as that previously described in detail in conjunction with the form of FIGS. 1, 2 and 3.

As will be appreciated, other basic configurations can be used depending upon particular manufacturing and/or space requirements. Further, changes as deemed necessary can be made in the location of the various inlet and outlet ducts, and flue directing internal baffles can be provided in conjunction therewith should such be deemed necessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An energy conservation system in the form of a heat exchange apparatus, comprising, in combination:
    a. an outer chamber having spaced, opposed ends, and provided with an inlet opening in one of the ends and an outlet opening in the other of the ends, the inlet opening and outlet opening arranged for passing a first flow of gas through the outer chamber;
    b. an inner chamber including a continuous wall disposed within the outer chamber and having spaced opposed ends arranged opposite the ends of the outer chamber, the one of the ends opposite the inlet opening of the outer chamber being an opening end in spaced alignment with the inlet opening of the outer chamber, and the other of the ends, arranged opposite the outlet opening of the otuer chamber, being a closed end, the opening end receiving the first flow of gas from the inlet opening, the closed end reversing the flow of gas and returning the gas along the continuous wall to the open end, and the first flow of gas further flowing from the open end to the outlet end of the outer chamber; and
    c. an intermediate chamber having an inner wall common with the inner chamber, and an outer wall disposed between and spaced from the inner wall and the outer chamber, the intermediate chamber being sealed relative to the inner chamber and the outer chamber and provided with an inlet aperture and an outlet aperture, both apertures arranged for passing a second flow of gas through the intermediate chamber.

2. The system of claim 1 further including an inlet duct and an outlet duct communicated with said outer chamber.

3. The system of claim 2 further including second inlet and outlet ducts communicating with the interior of the intermediate chamber.

4. The system of claim 3 wherein said chambers are rectangular in cross section.

5. The system of claim 3 wherein said chambers are triangular in cross section.

6. The system of claim 3 wherein said chambers are cylindrical.

7. The system of claim 2 further including a second inlet duct and a second outlet duct, said second ducts arranged surrounding the apertures for communicating solely with the interior of the intermediate chamber.

* * * * *